United States Patent
Bamberger

Patent Number: 5,623,335
Date of Patent: Apr. 22, 1997

[54] LASER RANGE FINDER WITH TARGET QUALITY DISPLAY

[75] Inventor: Stephen J. Bamberger, Lenexa, Kans.

[73] Assignee: Bushnell Corporation, Overland Park, Kans.

[21] Appl. No.: 433,749

[22] Filed: May 4, 1995

[51] Int. Cl.$^6$ .............................. G01C 3/08; G01B 11/26
[52] U.S. Cl. .................................. 356/5.01; 356/139.08; 356/141.1
[58] Field of Search .............................. 356/141.1, 4.01, 356/5.01, 5.1, 139.08; 342/118, 134, 135, 133, 146

[56] References Cited

U.S. PATENT DOCUMENTS

| | | |
|---|---|---|
| 3,464,770 | 9/1969 | Schmidt . |
| 3,680,958 | 8/1972 | Von Bose . |
| 3,698,811 | 10/1972 | Well . |
| 3,832,056 | 8/1974 | Shipp et al. . |
| 3,852,579 | 12/1974 | Sohn et al. . |
| 4,346,989 | 8/1982 | Gort et al. . |
| 4,453,825 | 6/1984 | Buck et al. . |
| 4,527,894 | 7/1985 | Goede et al. . |
| 4,569,599 | 2/1986 | Bolkow et al. . |
| 4,620,788 | 11/1986 | Giger . |
| 4,732,472 | 3/1988 | Konig et al. . |
| 4,787,739 | 11/1988 | Gregory .................................. 356/4.03 |
| 4,948,246 | 8/1990 | Shigematsu . |
| 5,291,262 | 3/1994 | Dunne . |
| 5,359,404 | 10/1994 | Dunne . |
| 5,471,215 | 11/1995 | Fukuhara et al. . |
| 5,491,546 | 2/1996 | Wascher et al. ...................... 356/4.03 |

OTHER PUBLICATIONS

RCA AN/GVS-5; Burlington, MA 01803; Aug. 30, 1976.

*Primary Examiner*—Stephen C. Buczinski
*Attorney, Agent, or Firm*—Litman, McMahon and Brown, L.L.C.

[57] ABSTRACT

A laser range finder includes a circular in-sight field of view which incorporates within it a magnified "TV view" of the target area with the TV view roughly approximating the rectangular shape of a standard television picture. Also within the circular field, over and under the TV view, are a target quality indicator, a range distance display, and other indicators. Within the TV view is a targeting reticle which indicates roughly the footprint of ranging laser pulses such that a target can be selected. The target quality indicator is a bar graph which displays the number of identifiable received reflected laser pulses from a series of such pulses emitted by the range finder. By aiming the range finder at various targets via the footprint reticle, repeatedly firing the range finder and monitoring the target quality graph for each firing, a user can move the range finder to find a surface proximate the target with a reflective quality sufficient to yield an accurate target range reading.

20 Claims, 4 Drawing Sheets

LASER RANGE FINDER WITH TARGET QUALITY DISPLAY

BACKGROUND OF THE INVENTION

1. Field of the Invention

This invention is directed to a hand-held laser range finder, and, more particularly, to such a range finder with a TV-type viewing field and a reticle representing the laser footprint and with a target quality bar graph display.

2. Description of the Related Art

Laser range finders have been manufactured for a number of years. Typically such range finders send a laser pulse and receive the pulse as reflected from a target. An internal clock monitors the time difference between the transmitted and received pulses, halves the time difference and multiplies it by the speed of light to thereby derive a distance from the range finder to the target.

One problem with prior art range finders is that the measured time periods are so short that extremely fast clocks and very sophisticated circuitry are required for accurate distance ranging. Ideally a range finder should be capable of accuracy within approximately 1 meter at a 1000 meter range. For each additional meter of range, a laser light pulse takes approximately 3 nanoseconds extra in transit. This, then, is the shortest time period which must be measured. Thus, for distances of ±1 meter to be accurately measured, a clock with a frequency of 160 MHz is required. Processors capable of operating at this clock speed are expensive, which effectively prices typical prior art range finders well beyond the mass consumer market.

A method has been developed to obviate the need for such high frequency clocks in a laser range finder. This method, developed by Laser Tech, Inc. of Colorado, is described in application for U.S. patent Ser. No. 08/375,945, entitled LASER RANGE FINDER HAVING SELECTABLE TARGET ACQUISITION CHARACTERISTICS AND RANGE MEASURING PRECISION, filed Jan. 19, 1995, which is incorporated herein by reference. In the Laser Tech circuit, a series of 30 or more individual laser pulses are emitted each time a trigger switch is engaged. A charging circuit is triggered with the emission of each pulse whereby a capacitor is charged at a first, relatively rapid rate during the time of flight for each pulse. After each return pulse is detected, a discharging circuit is triggered which discharges the capacitor at a second, much slower rate. A microcontroller times the discharge period and calculates a range based upon the time of discharge by the use of a calibrated formula. In one example, the capacitor discharge rate was 1000 times slower than the charging rate, thus allowing an 8 MHz crystal oscillator to be used as a timer clock source to yield an accuracy of ±1 meter at a 1000 meter range. An automatic noise threshold circuit sets a minimum threshold noise level which allows reliable detection of reflected laser pulses and a dithering circuit selectively provides increased accuracy.

In the Laser Tech circuit a minimum number of valid reflected pulses must be received from the series of emitted pulses in order to yield a desired ranging accuracy. The number of received pulses is dependent upon the "target quality", i.e. the reflective capabilities of the target. This varies greatly among target materials, and other factors such as atmospheric conditions, open field versus brushy surroundings, etc. also effect the number and quality of received pulses. However, without information relating to target quality, a user of such a range finder would not be able to isolate the reason for a lack of a distance reading, i.e. low battery, equipment malfunction, target quality, etc.

It is clear then, that a need exists for a laser range finder which utilizes relatively slow speed clocks to accurately sense range distances to within ±1 meter. Such a laser range finder should include an indication of target quality such that a user of the range finder can be apprised of the reflective quality of the target, thus enabling him or her to select a different target feature in the event of a low quality target indication.

SUMMARY OF THE INVENTION

In the practice of the present invention, a laser range finder includes a circular in-sight field of view which incorporates within it a magnified "TV view" of the target area which roughly approximates the rectangular shape of a standard television picture. Also within the circular field, over and under the TV view, are a target quality indicator, a target range display, a sensitivity mode indicator and other indicators. Within the TV view is an aiming reticle which indicates roughly the footprint of ranging laser pulses emitted by the range finder such that a target can be reliably selected.

The range finder emits a series of laser pulses and times the flight time of each pulse from the range finder to the target and back. An average flight time for the pulse series is calculated to determine the range to the target. A microcontroller uses a pulse stack and comparator to detect and identify valid pulse returns and the number of pulse returns, either as an absolute number or as a ratio of returned to transmitted pulses, is output to a target quality indicator. The target quality indicator is a bar graph which graphs the number of identifiable received reflected pulses. By aiming the range finder at various targets via the footprint reticle, repeatedly engaging a fire button on the range finder and monitoring the target quality bar graph for each firing, a user can move the range finder around to find a surface proximate the target with a reflective quality sufficient to yield an accurate reading.

OBJECTS AND ADVANTAGES OF THE INVENTION

The principle objects and advantages of the present invention include: to provide an improved laser range finder; to provide such a laser range finder which emits a series of laser pulses toward a target with each engagement of a fire switch; to provide such a laser range finder which detects each identifiable reflected return pulse from said series; to provide such a laser range finder with a target quality indicator indicating the number of returned pulses or the ratio of the number of returned pulses vs. the number of emitted pulses; to provide such a laser range finder with a reticle which approximates the footprint of the emitted laser pulses for accurately aiming the range finder; to provide such a laser range finder which is capable of using a relatively slow sampling clock to determine highly accurate target ranges; to provide such a laser range finder with a circular field of view; to provide such a range finder with a magnified "TV view" of the target area which forms a portion of the circular field of view; to provide such a laser range finder which can be produced at an economical cost, enabling sales to a mass consumer market; and to provide such a laser range finder which is attractive, rugged, reliable and which is particularly well suited for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

I. Introduction and Environment

Figure 1:
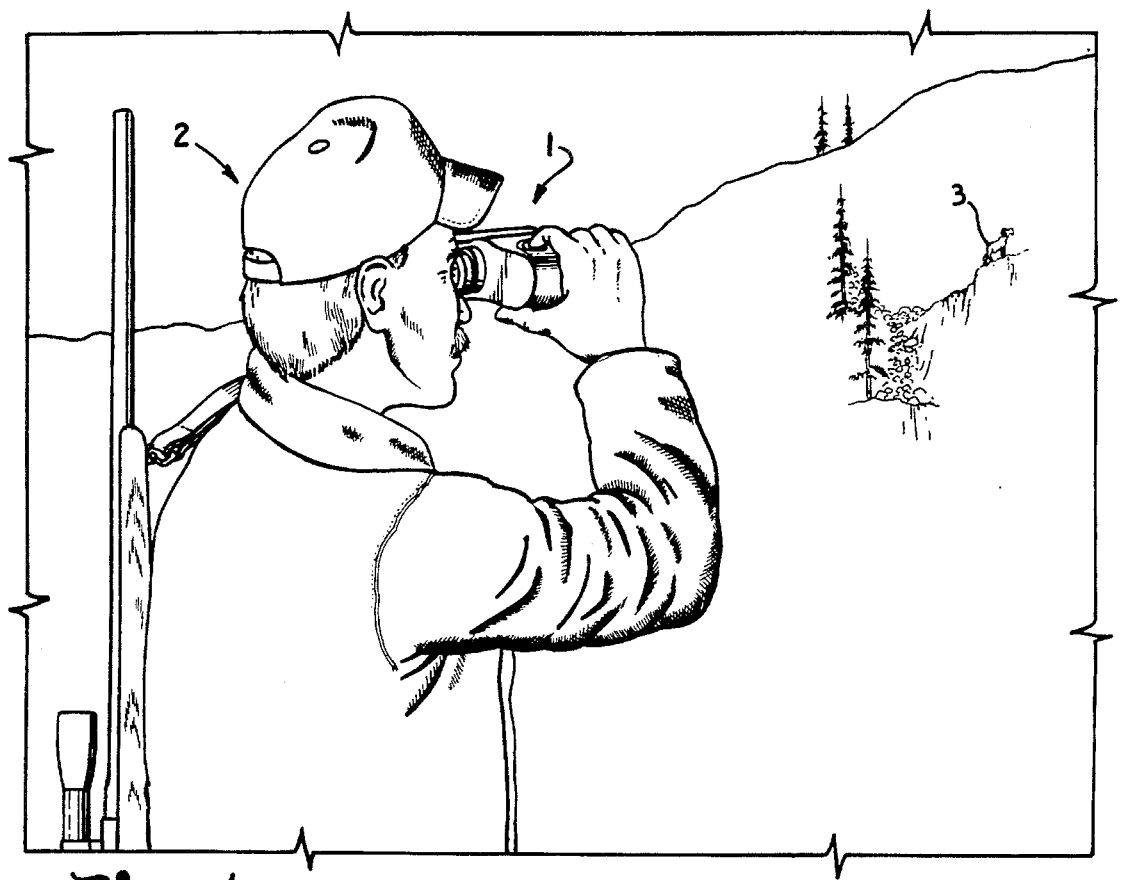
FIG. 1 is a perspective view of a hunter using the inventive laser range finder to determine the range to a target, with the target illustrated as a bighorn sheep.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Certain terminology will be used in the following description for convenience in reference only and will not be limiting. For example, the words "up", "down", "right" and "left" will refer to directions in the drawings to which reference is made. The words "inward" and "outward" will refer to directions toward and away from, respectively, the geometric center of the embodiment being described and designated parts thereof. Said terminology will include the words specifically mentioned, derivatives thereof and words of a similar import.

2. Laser Range Finder

Referring to the drawings in more detail, and particularly FIGS. 1–5, the reference numeral 1 generally designates a laser range finder in accordance with the present invention. In FIG. 1, the range finder 1 is being used by a hunter 2 to range a target, here illustrated as a bighorn sheep 3. The rangefinder 1 includes circuitry and optics within a housing 4, which can comprise high impact plastic, for example.

While the use of the range finder 1 by a hunter is illustrated and described herein, the description is not intended to be in any way limiting. Other uses for the inventive range finder 1 include, but are not limited to, golfing, to enable golfers to determine an accurate range to a flag stick, archery, military uses, real property surveying, etc.

Figure 3:
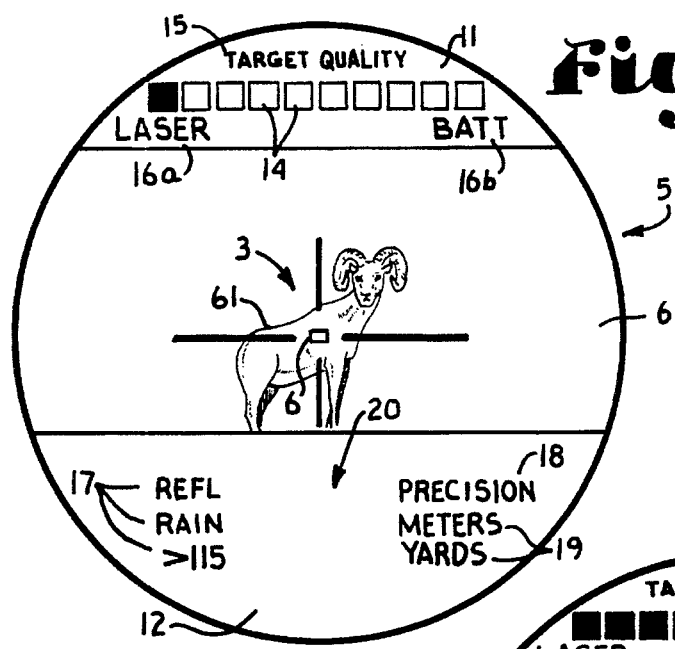
FIG. 3 is an enlarged representation of a circular field of view as seen through the range finder by the hunter of FIG. 1, with a target quality bar graph display indicating a relatively poor quality target and with no target range readout.
Figure 4:
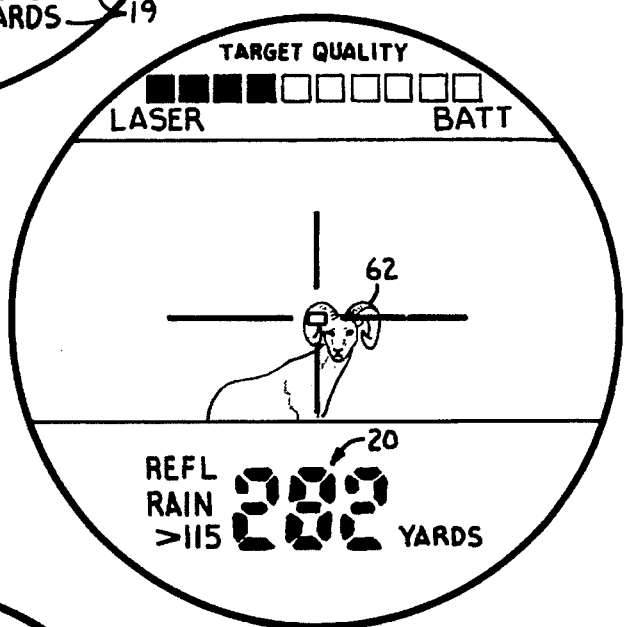
FIG. 4 is an enlarged representation of the circular field of view as seen by the hunter of FIG. 1, with a target quality indicator indicating a relatively good quality target and with a target range readout.
Figure 5:
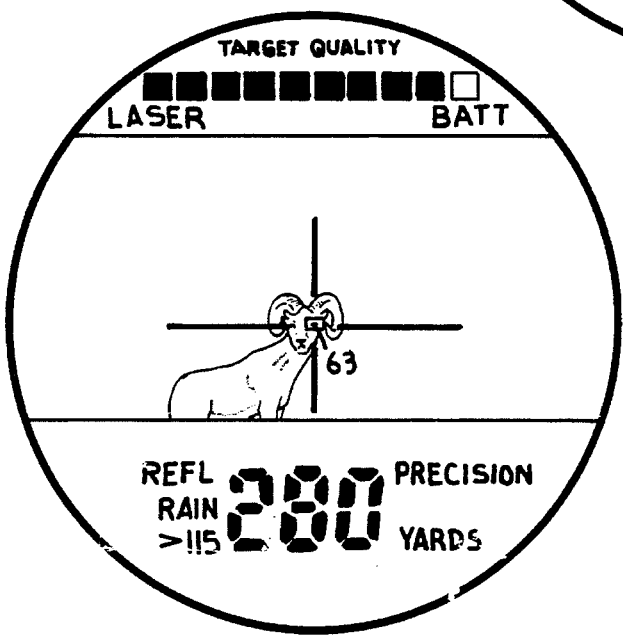
FIG. 5 is an enlarged representation of the circular field of view as seen by the hunter of FIG. 1, with a target quality indicator indicating an excellent quality target and with a highly accurate target range readout.

As the hunter 2 looks through the range finder 1, he sees a circular field of view 5, a center portion 6 of which is shaped as a "TV view" approximating the relative dimensions of a standard television screen. The range finder 1 optically presents a magnified image of the sheep 3 within the TV view section 6, as represented by FIG. 3. In one embodiment of the invention, a 4× magnification is achieved. The size of the sheep 3 represented in the TV view section 6 as shown in FIGS. 3–5 is exaggerated for purposes of explanation. A rectangular reticle 7, which approximates the footprint of laser pulses emitted by the range finder 1, is centered on the target, such as the sheep 3.

Also forming a portion of the circular field 5 are upper and lower information display areas 11 and 12, respectively. Within the upper display area 11, a bar graph 13 incudes a number of individual bar elements 14 along with permanent indicia 15 indicating "TARGET QUALITY" immediately above the bar graph 13. An indicia field 16a indicating the term "LASER" is located immediately below the bar graph 13, which field is highlighted during emission of laser pulses during ranging. A second indicia field 16b indicating "BATT" is highlighted during low battery conditions, as explained below.

Within the lower display area 12, on the left side, a sensitivity mode field 17 includes the alternative fields of "REFL", "RAIN", and ">115". On the right side of the display area 12, a "PRECISION" flag 18 is enabled when conditions enable the range finder 1 to achieve precision accuracy of ±1 yard. When the PRECISION flag 18 is not highlighted, conditions dictate an accuracy of ±3 yards. In addition, the measurement alternatives of "METERS" vs. "YARDS" can be selected and corresponding indicators 19 highlighted accordingly. Approximately centered between the sensitivity mode field 17 and the precision flag 18 is a seven segment display area 20 on which a target range is displayed.

Figure 6:
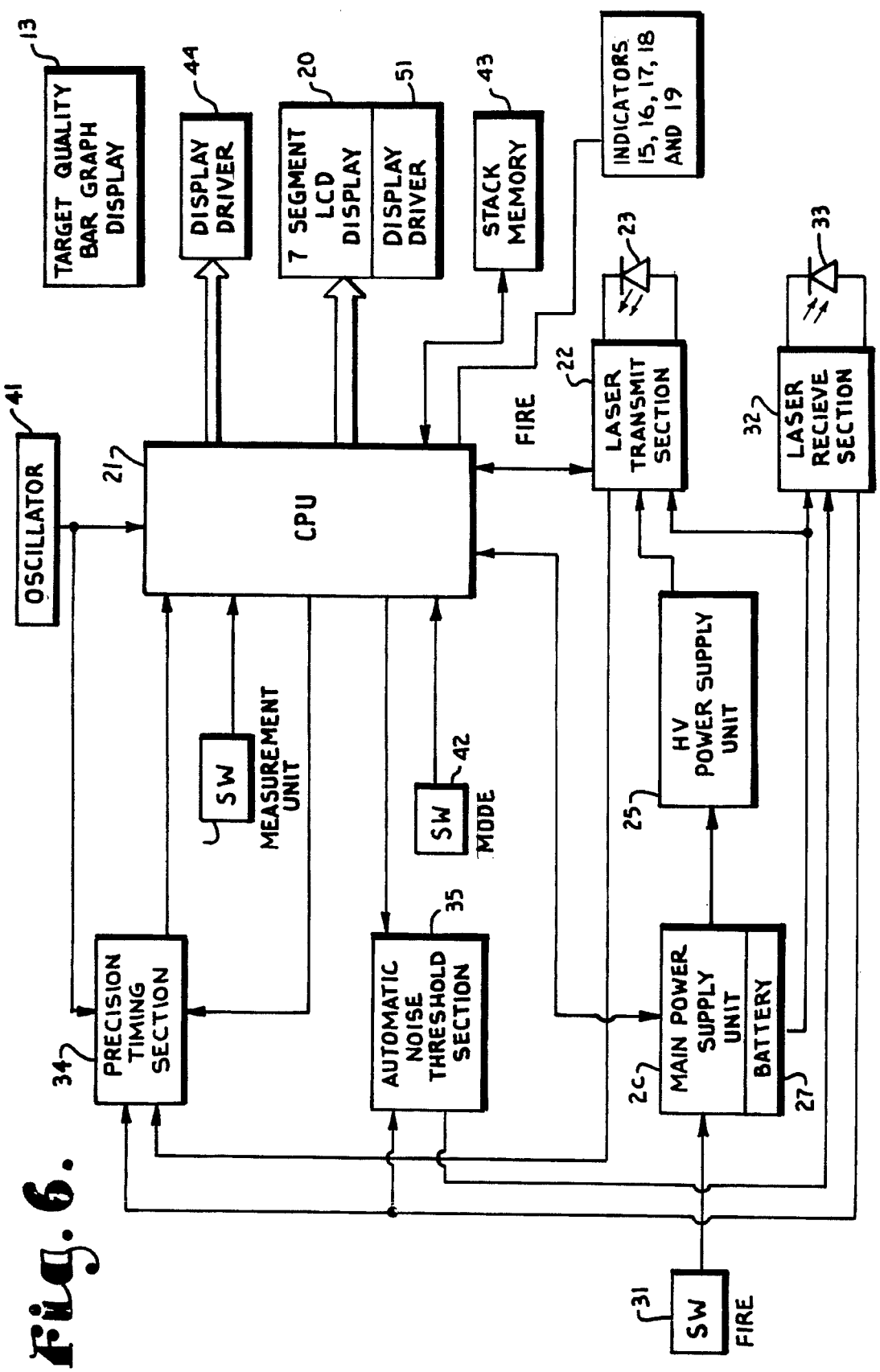
FIG. 6 is a block schematic electrical diagram of the laser range finder of FIGS. 1–5.

Referring to FIG. 6, the range finder 1 is illustrated in a block electrical schematic diagram. The range finder 1 includes a microcontroller 21 which is connected to a laser transmit section 22, which can comprise a power to laser diode 23 emitting infrared light beams with power supplied by a high voltage power supply 25, which is, in turn, supplied by a self-contained main power supply 26 including a battery 27. The microcontroller 21, once enabled via a fire switch 31 operated by the user 2, is programmed to cause the laser generator 22 to fire a series of laser light pulses, each with a duration of approximately 5 to 100 nanoseconds. The series can contain, for example 30 laser pulses, of which 20 are used for calibration purposes and the remaining 10 of which are used for ranging calculations. This generally gives an accuracy range of ±3 yards at distances up to a maximum ranging distance of approximately 1000 yards. For more precise measurements, where conditions allow, an additional 30 pulses are transmitted, all of which are used for range calculations, with the results indicated by the highlighting of the "PRECISION" flag 18 in the lower display area 12. In other words, when target quality and environmental conditions allow a precise range measurement to within ±1 yard, the PRECISION flag 18 is automatically highlighted to indicate to the user 2 that the indicated range is accurate to within ±1 yard.

Once the laser pulses are reflected off of the target, such as the sheep 3, a portion of each pulse is returned to a laser receive section 32 which includes a laser receiving diode 33. Detection of a received pulse triggers a precision timing section 34 and an automatic noise threshold section 35, each of which is described in detail in the above-referenced application Ser. No. 08/375,945. Briefly, the precision timing section 34 charges a capacitor (not shown) at a first, relatively rapid rate during the flight time of an emitted laser pulse and discharges the capacitor at a much slower rate after detecting the return pulse. The discharge time is timed by the microcontroller 21, as clocked by an 8 MHz crystal oscillator 41 and the range to the target 3 is calculated based upon a predetermined, calibrated relationship between discharge times and range distances. The automatic noise threshold section 35 is basically a feedback circuit which establishes a minimum threshold noise level which is necessary to reliably detect reflected laser pulses. A mode switch 42 is used to select a sensitivity setting, such as "reflection" mode indicated by highlighting the REFL flag in the mode window 18 with which the laser receive section 32 is completely desensitized, requiring a retro reflector or other high grade reflector to return sufficient energy to the range finder 1 to trigger a range calculation. Other possible modes to be selected via the switch 42 include normal, "RAIN" or ">115" modes in which varying minimum ranging distances tolerated. For a normal setting, i.e. typical conditions with no rain and no obstruction between the user and a target, a minimum ranging distance of 15 yards is automatically established. No mode flag is highlighted for normal ranging minimums. During rain or other precipitation, if a minimum distance of 15 yards is used, reflection of laser pulses from rain drops at the minimum 15 yard distance will cause the range finder 1 to always indicate 15 yards. Accordingly, when the RAIN mode is selected, as indicated by highlighting the RAIN flag, minimum ranging distance is changed from 15 yards to 65 yards. At this minimum distance, any effect of interference by rain drops or other precipitation is negligible. Finally, when another object is stationed between the user and the target, such as when a tree branch or a bush is positioned at 80 yards but the target is beyond, at a distance of greater than 115 yards, the >115 yard mode is selected and the >115 flag highlighted. In this mode, minimum distance is changed to 115 yards so that the tree branch or bush at 80 yards is ignored during ranging calculations.

The microcontroller 21 includes a pulse stack memory section, represented by stack memory 43, in which pulse amplitudes and durations are stored as they are received. The microcontroller then compares each subsequent pulse with all of the stored pulses to determine a match. Any pulses which match are considered to be valid pulses and subsequent pulses can then be compared against the matched pulses. In this manner, legitimate laser pulse returns are distinguished from noise pulses. The microcontroller 21 then counts the received laser pulses and outputs the result to a display driver 44 which is connected to drive the bar graph 13. The greater the number of received pulses, the higher the number of displayed bars 14 on the bar graph 13. The bar graph 13 thus acts as an indicator of the reflective capacity of the target or of "target quality".

The microcontroller 21 is also programmed to lock onto a calculated target range when sufficient returned pulses are detected to provide an accurate readout. Normally at least two identifiable reflected laser pulses must be received and timed to allow an accurate range calculation, but the higher the ratio of received to emitted pulses, the more accurate is the range calculation. In the event that conditions and target quality permit a precision range measurement, additional pulses are transmitted, as described in the Laser Tech application, Ser. No. 08/375,945, and the PRECISION flag 18 is highlighted.

The seven segment range display 20 and a display driver 51 are connected to the microcontroller 21 to display the calculated target range once such a target range calculation is locked. A measurement unit select switch 52 is provided to select a range display of "METERS" or "YARDS" on the display section 19.

The bar graph 13 and the seven segment display 20, as well as the indicators 15–19 can utilize conventional LCD or LED, electrophoretic, ferro-electric, or other known display technology.

3. Operation

Referring to the drawings, and more particularly to FIGS. 1–5, a user of the range finder 1, such as the hunter 2, aims the range finder 1 at a target, such as the sheep 3. As shown in FIG. 3, the sheep 3 is optically magnified in the substantially rectangular TV view 6 within the circular field of view 5 of the range finder 1. Again, for purposes of illustration only, in FIGS. 3–5 the sheep 3 is shown at a larger size than the nominal 4× magnification of the range finder 1 would produce at the described range.

Once the aiming reticle 7 is positioned on the target 3, as illustrated in FIG. 3, the hunter 2 engages the fire switch 31, causing the microcontroller 21 to emit a series of laser pulses, as described above. If sufficient pulses are received to perform a reliable range calculation, the microcontroller 21 locks onto a calculated range and displays the calculated range on the seven segment range display 20. The hunter then can use the displayed range for configuring his shot trajectory to the target 3.

Figure 2:
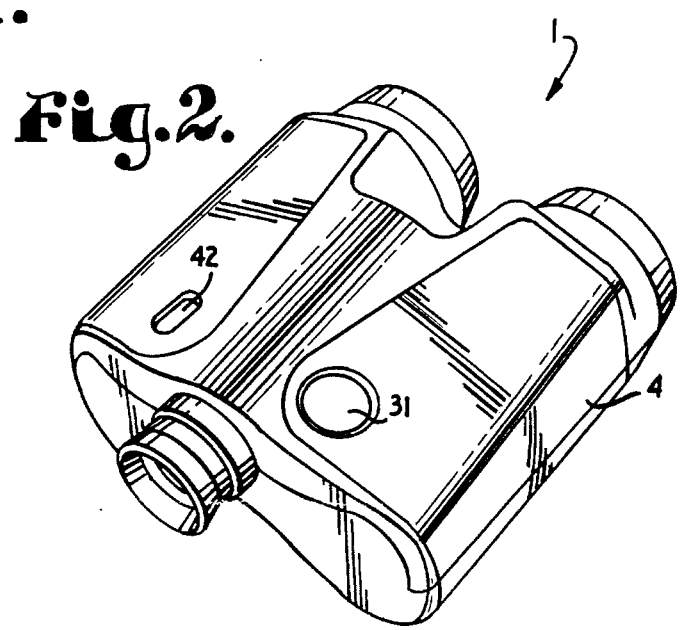
FIG. 2 is an enlarged, perspective view of the laser range finder of FIG. 1.

If, however, insufficient reflected pulses are received to perform a reliable range calculation, the microcontroller 21 nonetheless calculates a ratio of transmitted versus received pulses for display on the bar graph 13. As shown in FIG. 2, this ratio may only be 10% or so, with 1 out of 10 bars 14 displayed on the bar graph 13. The hunter 2 thus knows that the reflective capabilities of his target 3, i.e. the target quality, are insufficient to provide a reliable range calculation. For example, if the laser pulses are aimed at a portion of a torso 61 of the sheep 3, as shown in FIG. 3, the fur may not be reflective enough to allow the range finder 1 to lock onto a range. The hunter 2 then can adjust the aim of the range finder 1 to attempt to find a portion of the target 3 or the target surroundings which is 14 of a higher target quality. In the case of the sheep 3, perhaps the horns 62 or the eye 63 will provide the requisite target quality. Each time the hunter 2 adjusts the aim of the range finder 1, as shown in FIGS. 3, 4 and 5, he reengages the fire switch 31 to trigger a new range finding attempt. It may take 2 or 3 iterations, as represented by FIGS. 3–5, for a successful range finding calculation to be performed. In FIG. 4, for example, the horns 62 may be of a better target value than the torso 61, as indicated by 4 of the bars 14 being displayed on the bar graph 13, with the received pulses being sufficient to perform a range calculation which is reliable to within ±3 yards, here indicated as 282 yards. Finally, in FIG. 5, the sheep's eye 63 is so reflective that a near 100% return of pulses is achieved, allowing precision range calculation to within ±1 yard, as represented by the final range figure of 280 yards, as well as the display of nine out of the ten possible bars 14 in the target quality bar graph 13 and the highlighting of the PRECISION indicator 19.

Thus, by using the target quality bar graph 13 as an indicator, the hunter 2 is able to secure a precise range indication where, without the target quality bar graph 13, a reliable range indication might be impossible.

Figure 7:
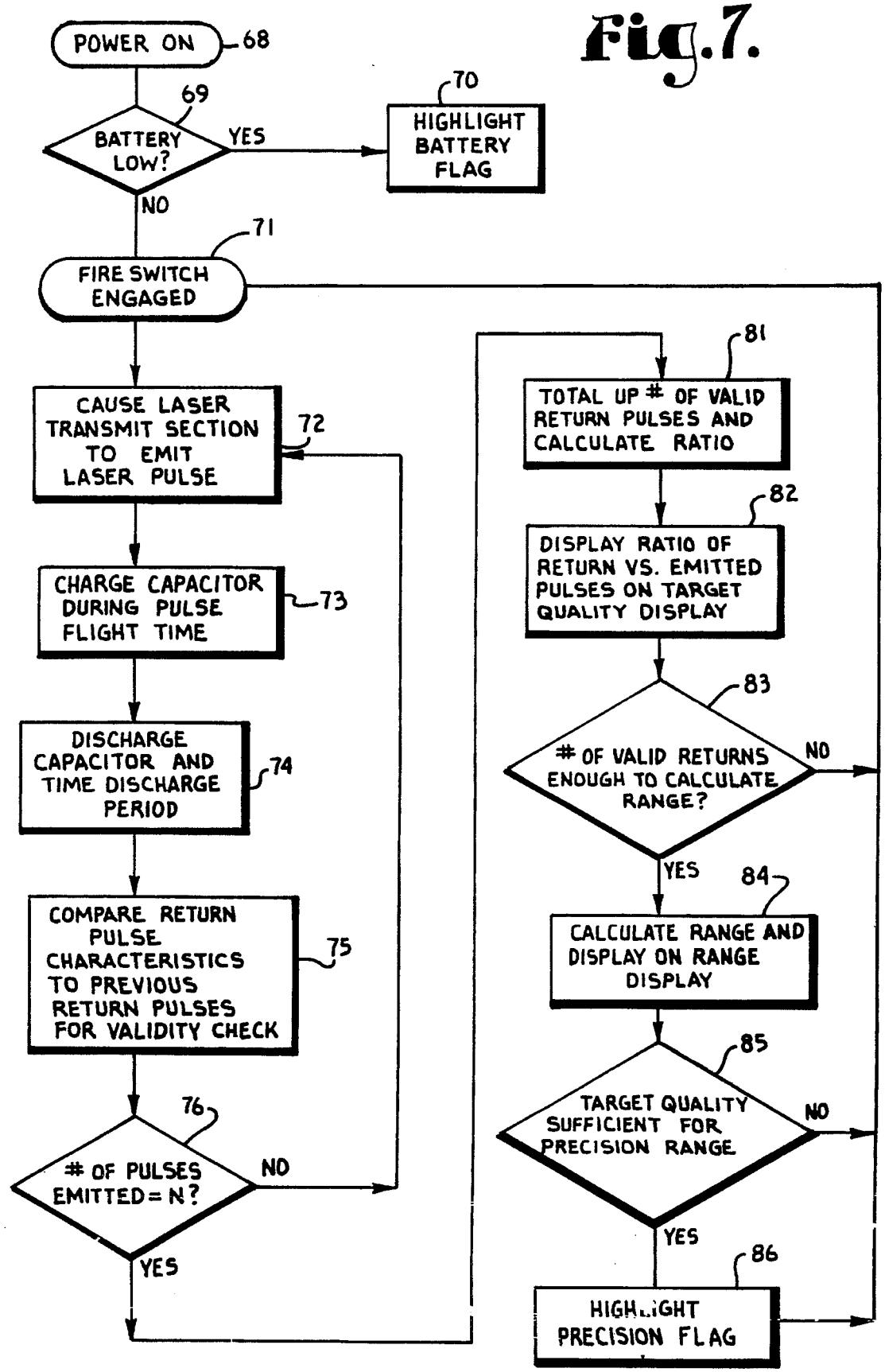
FIG. 7 is a logical flow chart illustrating a programmed algorithm for the microcontroller of FIG. 6.

Referring to FIG. 7, a flow chart is indicative of a simplified logical algorithm performed by the programmable microcontroller 21. At block 68, the range finder 1 is powered up and, at decision block 69, the microcontroller checks the condition of battery 27. In the case of a low battery condition, the microcontroller 21 highlights the BATT flag 16b in the top display portion 11 as a low battery indicator. At block 71, the microcontroller 21 monitors the fire switch 31 for an engagement signal. When a fire signal is received, the microcontroller 21, at block 72, enables the laser transmit section 22 to emit a series of laser pulses toward the selected target with a footprint approximately equal to the size of the reticle 7 in the range finder TV view 6. For each pulse sent, a capacitor (not shown) is charged in the precision timing section 34, as indicated at block 73. After a reflected pulse is detected by the laser receive section 32, the charging of the capacitor in the timing section 34 is halted and, shortly thereafter, discharging of the capacitor is started and timed by the microcontroller 21, as indicated at block 74. At block 75, each detected return pulse is verified as determined by a comparison of the pulse characteristics with other pulses already stored in the pulse stack memory 43, as described briefly earlier and in detail in the Laser Tech application Ser. No. 08/375,945.

At decision block 76, the microcontroller 21 counts the number of emitted pulses and repeats the emission and detection process of blocks 72–76 until N number of pulses have been emitted. At blocks 81 and 82, a ratio of valid returned laser pulses vs. emitted pulses is calculated and displayed on the bar graph 13. At decision block 83, the microcontroller 21 determines if sufficient valid return pulses have been received and timed to perform a reliable range calculation. If the answer is NO, the microcontroller 21 times out and awaits a further trigger enable signal. If the answer is yes, at block 84, the microcontroller 21 performs the range calculation, locks in a calculated range and displays the calculated range on the seven segment display 20. At decision block 85, the microcontroller 21 determines whether the number and quality of returned pulses is sufficient for a precision ranging calculation with accuracy to within ±1 yard, and, if the answer is YES, at block 86, the PRECISION flag 18 is highlighted.

While the target quality bar graph 13 has been described and illustrated as being used with a multiple pulse averaging range finder 1, the concept could also be used effectively with a single pulse system with the bar graph indicating the amplitude and/or duration of a detected returned pulse. It should be emphasized again that the illustrated use of the range finder 1 by a hunter is but one of a wide variety of potential uses for the range finder 1, as previously described.

It is to be understood that while certain forms of the present invention have been illustrated and described herein, it is not to be limited to the specific forms or arrangement of parts described and shown.

What is claimed and desired to be secured by Letters Patent is as follows:

1. In a laser range finder, said range finder including a laser transmit section for emitting laser pulses directed toward a target, a laser receive section for receiving laser pulses reflected from said target, timing means for timing a flight time for each said pulse from a time of emission of said pulse to a time of reception of said reflected pulse, calculating means for calculating a range to said target based upon said pulse flight times, the improvement comprising:

a. calculating means for evaluating the reflective quality of said target based upon the number of detected reflected laser pulses and/or the ratio of detected reflected laser pulses vs. the number of emitted laser pulses; and b. target quality display means for displaying said reflective quality of said target.

2. The laser range finder of claim 1, wherein said target quality display means comprises a bar graph.

3. The laser range finder of claim 1, and further comprising indicia selectively indicating a low battery condition.

4. The laser range finder of claim 1, and further comprising a user viewing means comprising:

a. an in-sight circular field of view including:
      i. a first display portion comprising a magnified TV view of the target; and
      ii. a second display portion comprising said target quality display.

5. The laser range finder of claim 4, wherein said magnified TV view includes a targeting reticle which approximates the footprint of said laser pulses emitted from said range finder.

6. The laser range finder of claim 3, wherein said circular field of view further includes a third display portion comprising a target range display.

7. The laser range finder of claim 6, wherein said third display portion also comprises a PRECISION flag for indicating that a precision range calculation is being displayed.

8. The laser range finder of claim 6, and further comprising selection means for selecting a minimum ranging mode.

9. The laser range finder of claim 8, wherein said third portion of said circular field of view also includes a minimum ranging mode display.

10. In a laser range finder, said range finder including a laser transmit section for emitting laser pulses directed toward a target, a laser receive section for receiving laser pulses reflected from said target, timing means for timing a flight time for each said pulse from a time of emission of said pulse to a time of reception of said reflected pulse, calculating means for calculating a range to said target based upon said pulse flight times, the improvement comprising:

a. calculating means for evaluating the reflective quality of said target based upon the number of detected reflected laser pulses and/or the ratio of detected reflected laser pulses vs. the number of emitted laser pulses;

b. an in-sight field of view including:
      i. a first display portion comprising a magnified TV view of the target said magnified TV view including a targeting reticle which approximates the footprint of said laser pulses emitted from said range finder; and
      ii. a second display portion comprising target quality bar graph display means for displaying said reflective quality of said target.

11. The laser range finder of claim 10, and further comprising indicia selectively indicating a low battery condition.

12. The laser range finder of claim 10, wherein said insight field of view further includes a third display portion comprising a target range display.

13. The laser range finder of claim 12, wherein said third display portion also comprises a PRECISION flag for indicating that a precision range calculation is being displayed.

14. The laser range finder of claim 12, and further comprising selection means for minimum ranging mode.

15. The laser range finder of claim 14, wherein said third display portion also includes a minimum ranging mode display.

16. In a laser range finder, said range finder including a laser transmit section for emitting laser pulses directed toward a target, a laser receive section for receiving laser pulses reflected from said target, timing means for timing a flight time for each said pulse from a time of emission of said pulse to a time of reception of said reflected pulse, calculating means for calculating a range to said target based upon said pulse flight times, the improvement comprising:

a. calculating means for evaluating the reflective quality of said target based upon the number of detected reflected laser pulses and/or the ratio of detected reflected laser pulses vs. the number of emitted laser pulses; and b. an in-sight field of view including:
  i. a first portion comprising a magnified TV view of the target said magnified TV view including a targeting reticle which approximates the footprint of said laser pulses emitted from said range finder;
  ii. a second portion comprising target quality bar graph display means for displaying said reflective quality of said target; and
  iii. a third portion comprising a target range display.

17. The laser range finder of claim 16, and further comprising indicia selectively indicating a low battery condition.

18. The laser range finder of claim 16, wherein said third display portion also comprises a PRECISION flag for indicating that a precision range calculation is being displayed.

19. The laser range finder of claim 16, and further comprising selection means for selecting a minimum ranging mode.

20. The laser range finder of claim 19, wherein said third display portion also includes a minimum ranging mode display.

* * * * *